US012698359B2

(12) United States Patent
Brandt et al.

(10) Patent No.: US 12,698,359 B2
(45) Date of Patent: *Aug. 4, 2026

(54) CATIONIC EPOXY COMPOSITIONS

(71) Applicant: Henkel AG & Co. KGaA, Duesseldorf (DE)

(72) Inventors: Adrian Brandt, Essen (DE); Alissa Besler, Neuss (DE); Horst Beck, Neuss (DE); Sascha Andronescu, Duisburg (DE); Johannes Gerardus de Vries, Rostock (DE); Sarah Kirchhecker, Rostock (DE); Bernhard M. Stadler, Rostock (DE); Sergey Tin, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 569 days.

This patent is subject to a terminal disclaimer.

(21) Appl. No.: 18/198,215

(22) Filed: May 16, 2023

(65) Prior Publication Data

US 2023/0287168 A1 Sep. 14, 2023

Related U.S. Application Data

(63) Continuation of application No. PCT/EP2021/077223, filed on Oct. 4, 2021.

(30) Foreign Application Priority Data

Nov. 16, 2020 (EP) ..................................... 20207701

(51) Int. Cl.
| | |
|---|---|
| *C08G 59/22* | (2006.01) |
| *C08G 59/36* | (2006.01) |
| *C08K 3/36* | (2006.01) |
| *C09D 163/00* | (2006.01) |
| *C09J 163/00* | (2006.01) |

(52) U.S. Cl.
CPC ........... *C08G 59/223* (2013.01); *C08G 59/36* (2013.01); *C08K 3/36* (2013.01); *C09D 163/00* (2013.01); *C09J 163/00* (2013.01)

(58) Field of Classification Search
CPC ........ C08G 59/233; C08G 59/36; C08K 3/36; C09D 163/00; C09J 163/00
See application file for complete search history.

(56) References Cited

U.S. PATENT DOCUMENTS

| | | | |
|---|---|---|---|
| 4,546,155 A | 10/1985 | Hirose et al. | |
| 4,559,393 A * | 12/1985 | Holubka ................ | C08G 59/10 |
| | | | 525/530 |
| 4,833,226 A | 5/1989 | Ishimura et al. | |
| 5,077,376 A | 12/1991 | Dooley | |
| 7,226,976 B2 | 6/2007 | Koto et al. | |

FOREIGN PATENT DOCUMENTS

| | | |
|---|---|---|
| EP | 20207707.9 | 11/2020 |
| GB | 1121196 A | 7/1968 |
| JP | 2008214567 A | 9/2008 |
| WO | 2019234038 A1 | 12/2019 |
| WO | 2020212149 A1 | 10/2020 |

OTHER PUBLICATIONS

Miyagawa H et al: "Fracture Toughness Andimpact Strength of Anhydride-Curedbiobased Epoxy",Polymer Engineering and Science,Br00kfield Center, US,vol. 45, No. 4, Apr. 1, 2005 (Apr. 1, 2005),pp. 487-495, XP001227904,Issn: 0032-3888, DOI: 10.1002/PEN.20290* the whole document *.

Ortun0 R M et al: "Enantiomeric@b-angelica lactone epoxides: theirsyntheses from suitable chiral precursorsand their use in the preparation ofblastmycinone",Tetrahedron, Elsevier Sience Publishers,Amsterdam, NL, vol. 43, No. 9,Jan. 1, 1987 (Jan. 1, 1987), pp. 2191-2198, XP026596471, ISSN: 0040-4020, D0I:10.1016/50040-4020(01)86801-0[retrieved on Jan. 1, 1987].

PCT International Search Report—WO PCT/EP2021/077223—Completed: Dec. 7, 2021 Mailing date: Jan. 5, 2022—Number of pp. 4.

* cited by examiner

*Primary Examiner* — John E Uselding
(74) *Attorney, Agent, or Firm* — Steven C. Bauman

(57) ABSTRACT

The present invention relates to an epoxy composition comprising a) a cycloaliphatic epoxy resin; b) a curing agent; and c) a bio-based epoxy compound having a structure I:

(I)

The composition according to the present invention can be used as a structural adhesive, a coating and a primer.

13 Claims, No Drawings

CATIONIC EPOXY COMPOSITIONS

TECHNICAL FIELD OF THE INVENTION

The present invention relates to an epoxy composition comprising a) a cycloaliphatic epoxy resin; b) a curing agent; and c) a bio-based epoxy compound having a structure I:

(I)

BACKGROUND OF THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue and seal the joints from corrosive species.

Epoxy adhesives consist primarily of epoxy monomers and oligomers and epoxy based reactive diluents. There is a constant need for new chemicals having new technical properties. For example, low odour and low vapor pressure monomers to improve health and safety of a production line and end users.

These epoxy monomers and oligomers and epoxy based reactive diluents are traditionally produced using petrol-based raw materials. To increase sustainability, the end users of the epoxy adhesives are now requesting products with increased bio-based content without compromising performance.

Therefore, there is a need for epoxy adhesives comprising new chemicals obtained from increased quantities of bio-based raw material without losing desired physical properties and performance.

SUMMARY OF THE INVENTION

The present invention relates to an epoxy composition comprising a) a cycloaliphatic epoxy resin; b) a curing agent; and c) a bio-based epoxy compound having a structure I:

(I)

The present invention encompasses a cured product of an epoxy composition according the present invention.

The present invention relates to use of an epoxy composition according to the present invention as a structural adhesive, a coating, or a primer.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

As used herein, the term "consisting of" excludes any element, ingredient, member or method step not specified.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skilled in the art to which this invention belongs to. By means of further guidance, term definitions are included to better appreciate the teaching of the present invention.

The present invention relates to an epoxy composition comprising a) a cycloaliphatic epoxy resin; b) a curing agent; and c) a bio-based epoxy compound having a structure I:

(I)

The bio-based epoxy compound I is preferably a β-isomer.

The epoxy compound I is synthetized from levulinic acid (LA) as illustrated in schemes 1-3 below.

Scheme 1 below illustrates synthesis of alpha-angelica lactone (α-AL) from levulinic acid (LA) by reactive distillation.

Scheme 1

Route to obtain β-angelica lactone (β-AL) from α-AL is illustrated in scheme 2 below. α-AL is isomerized to β-AL by using triethyl-amine as a catalyst at 100° C. without the use of a solvent. A mixture of β-AL:α-AL-80:20 is reached after one hour. It has been found that increasing the reaction time does not yield higher β-AL content, because dimerization of the lactones is a competing side reaction. β-AL can be obtained in a yield of up to 37%.

Scheme 2

Scheme 3 below illustrates how epoxy compound I is synthesized by oxidation of β-AL by using NaOCl in pyridine or H₂O₂ in THF with Triton B as base and phase transfer agent.

Scheme 3

The bio-based epoxy compound having a structure I preferably consists of 100% bio-based carbon atoms according ASTM D6866.

The bio-based epoxy compound having a structure I may be present in a composition according to the present invention in a quantity of from 1 to 80% by weight based on the total weight of the composition, preferably from 2 to 65%, more preferably from 3 to 45% and even more preferably from 4 to 30%.

The applicant has found out that these quantities are preferred because higher quantities than 80% may lead to a high exothermic reaction which will shorten the pot life. Further, higher quantities may lead settling of the inorganic fillers (used as tougheners). Quantities lower than 1% may not provide desired technical effect.

The Applicant has found out that addition of the bio-based epoxy compound having a structure I into an epoxy-based adhesive will provide low viscosity which is ideal for wetting and easier application by dispensing and pumping. In addition, low viscosity provides more flexibility to the formulation in form of possibility of using ingredients such as fillers and high viscous resins. The technical data in the example section indicates that use of bio-based epoxy compound having a structure I provides increased flexibility (tensile test) while maintaining Tg in dynamic mechanical analysis and this is good for impact resistance. Further, bio-based epoxy compound having a structure I enables a fast cure and improves wash-off resistance.

An epoxy composition according to the present invention comprises a cycloaliphatic epoxy resin. Preferably said cycloaliphatic epoxy resin is selected from the group consisting of (1)

(2)

(3)

(4)

(5)

(6)

5

-continued (7)

and mixtures thereof.

Non-limiting commercially available examples are Celloxide 2021 from Daicel, Araldite CY 170 BD from Huntsman and CER 4221 from Achiewell.

A cycloaliphatic epoxy resin may be present in an epoxy composition according to the present invention in a quantity of from 10 to 98% by weight based on the total weight of the composition, preferably from 12 to 85%, more preferably from 15 to 80% and even more preferably from 15 to 60%.

The epoxy composition according to the present invention may comprise an additional resin used in a combination with a cycloaliphatic epoxy resin.

Suitable additional resins for use in the present invention are for example aliphatic epoxy resins, aromatic epoxy resins, oxetane resins, vinyl ether resins and mixtures thereof.

An additional resin may be present in an epoxy composition according to the present invention in a quantity of from 1 to 60% by weight based on the total weight of the composition, preferably from 10 to 50%, more preferably from 20 to 30%.

The composition according to the present invention comprises a curing agent, which is preferably a cationic curing agent. Preferably said curing agent is selected from the group consisting of ammonium salts; pyridinium salts; imidazolium salts; guanidium salts; oxazolium salts; thiazolium salts; iodinium salts; sulfonium salts; and, phosphonium salts, and mixtures thereof.

Especially a hard cation non-nucleophilic anion curing agent may be used. Examples of such curing agents include salts of lithium and metals from Group II of the Periodic Table, and non-nucleophilic acid. Such non-nucleophilic acids have a pH of less than 1.0 when measured as a 10% by weight solution in water. Examples of the Group II metal salts include calcium and magnesium. Examples of non-nucleophilic acids include perchloric, fluoroboric, fluoroarsenic, fluoroantimonic and fluorophosphoric acids.

Further non-limiting examples of suitable curing agents to be used in the present invention are metal fluoroborates; bis(perfluoroalkyl sulfonyl)methane metal salts; aryl diazonium compounds; aromatic iodonium complex salts; aryl iodonium salts; aromatic onium salts of Group Ia elements; aromatic onium salts of Group Va elements; dicarbonyl chelates of Group IIIa-Va elements; onium salts of Group VIb elements in an MF6 anion where M is selected from phosphorous, antimony and arsenic arylsulfonium salts; aromatic sulfonium complex salts; bis(4-(diphenylsulfonio)-phenyl)sulfide-bis-hexafluorometallic salts such as the phosphate, arsenate, and antimonate salts; aryl sulfonium complex salts of Group II, V and VI elements; aromatic sulfonium or iodonium salts of halogen-containing complex ions of Group II, V and VI elements, aromatic onium salts of Group II; aromatic onium salts of Group VI; aryl sulfonium salts; aryl sulfonium complex salts such as aryl sulfonium hexafluorophosphate, and aryl sulfonium hexafluoroantimonate; aromatic iodonium salts such as diaryliodonium hexafluoroantimonate; lithium tetrafluoroborate; calcium di-tetrafluoroborate; magnesium di-tetrafluoroborate; lithium hexafluorophosphate; calcium di-hexaflourophosphate; magnesium di-hexaflourophosphate; lithium hexaflouroantimonate; lithium hexaflouroarsenate; lanthanide triflate salts; lanthanum triflate; ytterbium triflate; trimethoxyboroxine; trimethoxyboroxine-aluminum acetyl acetonate; amine-boron trihalide complexes; quaternary ammonium salts; quaternary phosphonium salts; tri-aryl sulfonium salts; di-aryl iodonium salts; diazonium salts; trialkoxyboroxine curing agents; boron trifluoride; boron trifluoride-etherate; sulphur trioxide (and hydrolysis products thereof); methane sulfonic acid.

It is noted that the cationic curing agent may comprise one, mixture of two or mixture of two or more above mentioned salts.

Non-limiting commercially available examples of curing agents are K-Pure CXC-1612 and CXC 1821 from King Industries, SP-150, SP-170 and SP-171 from Adeka, Irgacure 250, 270 and PAG 290 from BASF.

A curing agent may be present in an epoxy composition according to the present invention in a quantity of from 0.01 to 15% by weight based on the total weight of the composition, preferably from 0.1 to 10%, more preferably from 0.2 to 10% and even more preferably from 0.25 to 5%.

The applicant has found out that these levels provide ideal cure, when the quantity of the curing agent too high, it results in uncured and soft networks and occasional amine leakage (toxic and bad odour), whereas too low quantity leads to similar results but with unreacted epoxy groups.

An epoxy composition according to the present invention may further comprise an inorganic filler.

Preferably, said inorganic filler is selected from the group consisting of silica, fumed silica, diatomaceous earth, alumina, zinc oxide, iron oxide, magnesium oxide, tin oxide, titanium oxide, magnesium hydroxide, aluminium hydroxide, magnesium carbonate, barium sulphate, gypsum, calcium silicate, talc, glass bead, sericite activated white earth, bentonite, aluminium nitride, silicon nitride, magnesia dihydroxide, alumina trihydroxide, bariumsulfat, chalk, wollastonites and mixtures thereof.

Non-limiting commercially available examples are HDK H13L from Wacker and TS720, Ultrabond 5760 and Ultrabond 5780 from Cabot.

An inorganic filler may be present in an epoxy composition according to the present invention in a quantity of from 0.1 to 80% by weight based on the total weight of the composition, preferably from 5 to 65%, more preferably from 10 to 55% and even more preferably from 20 to 40%.

The applicant has found out that these quantities are preferred because higher quantities than 80% may lead that no continuous thermoset polymer is formed, but a more or less continuous composite material. In addition, in case of the cationic polymerization the residual water sitting at the interface of the inorganic particles acts as chain terminator, thus leading to a very low molecular weight after polymerization which may result in a practically not cure product. Quantities lower than 1% may not provide desired technical effect.

An epoxy composition according to the present invention may further comprise a toughener. In general, any toughener can be used in the composition according to the present invention.

Suitable tougheners to be used in the present invention are for examples (non-limiting examples)

OH or acid terminated polyols such as polyethers (PEG, PPG, PTHF and Velvetol) and polyesters (polyester polyols, polyester diols, fatty acid modified bisphenol A diglycidyl ether);

core shell particles such as PMMA shell and styrene-polybutadiene core or polybutadiene core or polysiloxane core;

non-reactive toughener rubbery materials and fillers such as capped elastomeric urethanes, block copolymer rubbers such as styrene-butadiene-isoprene based block copolymers, styrene-isoprene-styrene block copolymers and other rubbery block-copolymers;

reactive-toughener rubbery materials such as liquid rubbers with two or more epoxy-reactive groups (e.g. amine-, OH— and acid-terminated) such as butadiene-acrylonitrile-based rubbers, carboxyl-terminated butadiene-acrylonitrile (CTBN) with different contents of acrylonitrile (AN), amino-terminated butadiene-acrylonitrile (ATBN), epoxy-terminated butadiene-acrylonitrile (ETBN), and vinyl-terminated butadiene-acrylonitrile (VTBN); OH— terminated polyether polyols (PEG, PPG, PTHF type, 1.3-propane diol-based), OH-terminated polyethers based on cashew nut shell liquid, OH— or acid-terminated polyesters, OH— terminated thermoplastic polyurethanes, HTPB (hydroxyl-terminated polybutadiene), epoxidized HTPB, poly-farnesene based polyols, amine-terminated polyethers (Jeff amines), epoxy-capped elastomeric polyethers or polyesters (e.g. based on dimerized fatty acids);

inorganic fillers and reinforcing agents that can also act as toughener such as calcium carbonate, barium sulfate, calcium oxide, talc, carbon black, textile fibers, glass particles or fibers, aramid pulp, boron fibers, carbon fibers, mineral silicates, mica, powdered quartz, hydrated aluminum oxide, bentonite, various alumina-silicates including clays such as wollastonite and kaolin, fumed silica, silica aerogel, polyurea compounds, polyamide compounds and metal powders such as aluminum powder or iron powder;

bio-based tougheners that reduce Tg and increase flexibility such as cardanol based tougheners (OH-terminated and epoxy terminated), bio-based polyether polyol, polyfarnesene polyol, TPUs made from bio-based polyols and croda-B toughener (polyester with epoxy termination).

Preferably said toughener is selected from the group consisting of core shell rubber particles, liquid rubbers with two or more epoxy-reactive groups, OH— terminated polyether polyols, OH-terminated thermoplastic polyurethanes, OH— terminated polyethers, polyether urethanes, polyether rubber modified epoxy resins, fatty acid modified epoxy resins, polyether amine epoxy resins, rubber particles, styrene-butadiene-isoprene based block copolymers, poly-tetrahydrofuran-based toughener, cardolite toughener (PEG or EO modified Cardanol or glycidyl modified cardanol dimer (two epoxies)), polyfarnesene polyol, capped elastomeric urethanes, block copolymer rubbers, epoxy-capped elastomeric polyethers, epoxy-capped elastomeric polyesters, inorganic fillers, reinforcing agents and mixtures thereof.

Example of commercially available toughener include but is not limited to Kane Ace MX153 from Kaneka.

A toughener may be present in an epoxy composition according to the present invention in a quantity of from 0.1 to 50% by weight based on the total weight of the composition, preferably from 5 to 45%, more preferably from 10 to 40% and even more preferably from 20 to 40%.

The applicant has found the above ranges suitable for the composition according to the present invention. Too high toughener quantities may lead to poor adhesion properties, poor Tg value and undesired viscosity, whereas too low quantity may lead to a brittle system which is no longer applicable.

An epoxy composition according to the present invention may further comprise a reactive diluent. Suitable diluents for use in the present invention are for example methyl ethyl ketone (MEK), dimethylformamide (DMF), ethyl alcohol, propylene glycol methyl ether, propylene glycol methyl ether acetate, dibutyl phthalate, dioctyl phthalate, styrene, low molecular weight polystyrene, styrene oxide, allyl glycidyl ether, phenyl glycidyl ether, butyl glycidyl ether, vinylcyclohexene oxide, neopentylglycol diglycidyl ether, butanediol diglycidyl ether, hexanediol diglycidyl ether, diethylene glycol diglycidyl ether, dipropylene glycol diglycidyl ether poly(propylene glycol) diglycidyl ether, thio-diglycol diglycidyl ether, epsiloncaprolactam, butyrolactone, acrylonitrile, and mixtures thereof.

Examples of commercially available reactive diluents include but are not limited to DER 732, DER 736 from Palmer Holland, Cardura E10P from Exion and Efka 5381 from BASF.

A reactive diluent may be present in an epoxy composition according to the present invention in a quantity of from 0.2 to 15% by weight based on the total weight of the composition, preferably from 0.1 to 7.5%.

An adhesion promoter may be added to an epoxy composition according to the present invention to improve the adhesion of the epoxy resin to a substrate. Adhesion promoters may function by forming a new layer at the interface which binds strongly to both the substrate and the coating. The resultant interfacial region may also be more resistant to chemical attack from the environment.

The selection of adhesion promoter may be determined by the type of surface to which the composition will be applied. That said, the most common commercial adhesion promoters are organosilanes of which certain epoxy functional organosilanes types have been mentioned hereinbefore. Further types of adhesion promoter which may find utility herein include: organometallic compounds such as titanates and zirconates, of which specific examples include isopropyl tri(N-ethylaminoethylamino)titanate, tetraisopropyl di(dioctylphosphito)titanate, neoalkoxytrisneodecanoyl zirconate and zirconium propionate; dihydric phenolic compounds such as catechol and thiodiphenol; polyhydric phenols such as pyrogallol, gallic acid, or tannic acid; phosphoric acid esters such as tricresylphosphate and, plastisols, which are suspensions of polyvinyl chloride particles in a plasticizer.

Examples of commercially available adhesion promoters include but are not limited to Glymo from Evonik and Silquest from Momentive.

An adhesion promoter may be present in an epoxy composition according to the present invention in a quantity of from 0.01 to 5% by weight based on the total weight of the composition, preferably from 0.1 to 2.5%.

An epoxy composition according to the present invention may further comprise an electrically conductive filler. Preferably electrically conductive filler is selected from the group consisting of silver, nickel, carbon, carbon black, graphite, graphene, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof.

An electrically conductive filler may be present in an epoxy composition according to the present invention in a quantity of from 20 to 90% by weight based on the total weight of the composition, preferably from 30 to 70% and more preferably from 40 to 60%.

An epoxy composition according to the present invention may further comprise a thermal conductor.

Preferably thermal conductor is selected from the group consisting of alumina, alumina trihydroxide, boron nitride, aluminium nitride, and mixtures thereof. Equally some of the above mentioned electrically conductive fillers may be also used as thermal conductors.

Example of commercially available thermal conductor include but is not limited to Polartherm PT110 from Momentive.

A thermal conductor may be present in an epoxy composition according to the present invention in a quantity of from 0.01 to 5% by weight based on the total weight of the composition, preferably from 0.2 to 2.5%.

An epoxy composition according to the present invention may further comprise a wetting agent. Any wetting agent compatible with epoxy resins may be used. Preferably wetting agent is siloxane based wetting agent. Examples of commercially available wetting agent include but are not limited to Dynol 980 from Evonik and BYK W 9010, BYK W 940 from BYK.

A wetting agent may be present in an epoxy composition according to the present invention in a quantity of from 0.01 to 10% by weight based on the total weight of the composition, preferably from 0.1 to 5%, more preferably from 0.1 to 1.0%.

The present invention relates to a cured product of an epoxy composition according to the present invention. The epoxy composition according to the present invention is preferably cured under following conditions two days at 23° C. and 50% rh or 30 minutes at 80° C.

The present invention encompasses use of an epoxy composition according to the present invention as a structural adhesive, a coating or a primer. The epoxy composition according to the present invention is especially useful for applications where low viscosity is required for easy dispensing and wetting. Particularly as a structural adhesive in electronic device assembly, car assembly, car repair, aerospace, rail and defence.

EXAMPLES

TABLE 1

| Raw material | Example 1 | Example 2 |
|---|---|---|
| Celloxide 2021 | 12.78 | 10.25 |
| Epoxy (reactive part) | | |
| Angelica lactone epoxy | 2.80 | 5.61 |
| Epoxy (reactive part) | | |
| Kane Ace MX-553 | 6.96 | 6.96 |
| Toughener | | |
| HDK H13L | 3.50 | 3.50 |
| Filler | | |
| GLYMO | 1.00 | 1.00 |
| Adhesion promoter | | |
| PEG 400 | 7.50 | 7.50 |
| Flexibilizer, Toughener | | |
| GLYMO | 0.15 | 0.15 |
| Adhesion promoter | | |

10

TABLE 1-continued

| Raw material | Example 1 | Example 2 |
|---|---|---|
| Dynol 980 | 2.50 | 2.50 |
| Wetting agent | | |
| K-Pure CXC-1612 | 0.30 | 0.30 |
| Catalyst | | |
| Bariumsulfat | 12.50 | 12.50 |
| Filler, stabilizer for a catalyst | | |
| Polartherm PT110 | 0.75 | 0.75 |
| Thermal conductor | | |

Lap shear adhesion on steel:
Lap shear adhesion on steel is measured according to DIN EN ISO 527-1/-2.
Specimen: steel/steel (stainless, 14401, 1.5 mm)
Pretreatment specimen: cleaning with ethyl acetate
Adhesions Lap Shear samples: using 200 μm glass beads overlap: 10×25 mm
Curing: 30 min at 80° C. (between two steel plates in oven)

TABLE 2

| | Lab shear strength in MPa |
|---|---|
| Example 1 | 29.9 |

DMA was measured from cured films:
Specimen: 35×10×3 mm
Pretreatment forms: drying for 30 min at 80° C.
Curing: 30 min at 80° C. (between two steel plates in oven)

TABLE 3

| | Testing conditions | Tg [° C.] |
|---|---|---|
| Example 1 | −40° C.-200° C., 5K/min | 72.41 |

What is claimed is:

1. An epoxy composition comprising
a) a cycloaliphatic epoxy resin;
b) a curing agent; and
c) a bio-based epoxy compound having a structure I:

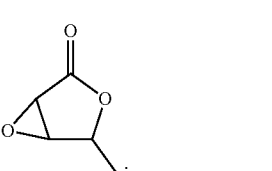

(I)

2. The epoxy composition according to claim 1, wherein said bio-based epoxy compound having a structure I is a β-isomer.

3. The epoxy composition according to claim 1, wherein said bio-based epoxy compound having a structure I consists of 100% bio-based carbon atoms according ASTM D6866.

4. The epoxy composition according to claim 1, wherein said bio-based epoxy compound having a structure I is present in a quantity of from 1 to 80% by weight based on the total weight of the composition.

5. The epoxy composition according to claim 1, wherein said cycloaliphatic epoxy resin is selected from the group consisting of

11

(1)

(2)

(3)

(4)

(5)

(6)

-continued (7)

and mixtures thereof.

6. The epoxy composition according to claim 1, wherein said cycloaliphatic epoxy resin is present in a quantity of from 10 to 98% by weight based on the total weight of the composition.

7. The epoxy composition according to claim 1, wherein said curing agent is selected from the group consisting of ammonium salts; pyridinium salts; imidazolium salts; guanidium salts; oxazolium salts; thiazolium salts; iodinium salts; sulfonium salts; and, phosphonium salts, and mixtures thereof.

8. The epoxy composition according to claim 7, wherein said curing agent is present in a quantity of from 0.01 to 15% by weight based on the total weight of the composition.

9. The epoxy composition according to claim 7, wherein said composition further comprises an inorganic filler.

10. The epoxy composition according to claim 9, wherein said inorganic filler is selected from the group consisting of silica, fumed silica, diatomaceous earth, alumina, zinc oxide, iron oxide, magnesium oxide, tin oxide, titanium oxide, magnesium hydroxide, aluminium hydroxide, magnesium carbonate, barium sulphate, gypsum, calcium silicate, talc, glass bead, sericite activated white earth, bentonite, aluminum nitride, silicon nitride, magnesia dihydroxide, alumina trihydroxide, barium sulfate, chalk, wollastonites and mixtures thereof.

11. The epoxy composition according to claim 10, wherein said inorganic filler is present in a quantity of from 0.1 to 80% by weight based on the total weight of the composition.

12. A cured product of an epoxy composition according to claim 1.

13. The epoxy composition according to claim 1 for use as a structural adhesive, a coating or a primer.

* * * * *